June 24, 1930.    F. H. OWENS    1,765,998
TITLE ATTACHMENT FOR SOUND CAMERAS
Filed July 13, 1927
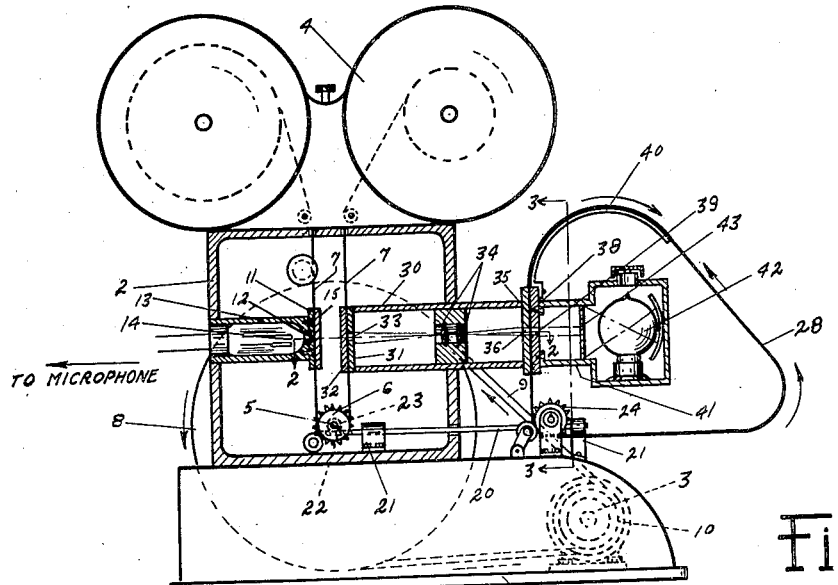
Fig.1.
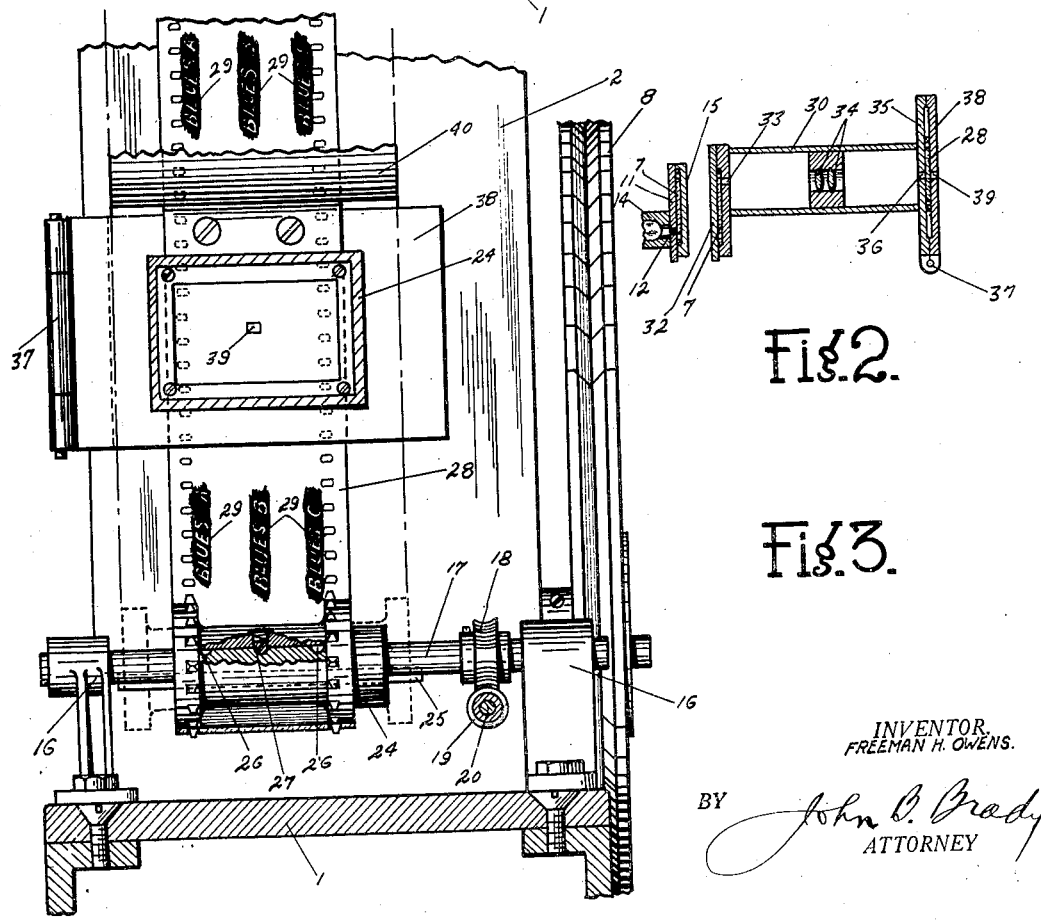
Fig.2.
Fig.3.
INVENTOR
FREEMAN H. OWENS.
BY John B. Brady
ATTORNEY Patented June 24, 1930

1,765,998

UNITED STATES PATENT OFFICE

FREEMAN H. OWENS, OF NEW YORK, N. Y.

TITLE ATTACHMENT FOR SOUND CAMERAS

Application filed July 13, 1927. Serial No. 205,448.

My invention relates to an attachment for sound recording cameras and the primary object thereof is to provide a means for photographing the sound record film simultaneously with the recording of the titles thereon.

Another important object is to provide a title film containing a plurality of titles which may be selectively photographed on the sound film as the sound records are consecutively recorded.

A further object lies in the provision of means for shifting the title film with respect to the exposure aperture whereby any one of the plurality of titles on such film may be photographed on the sound record.

Other objects and advantages in details of construction and operation will be apparent as the description proceeds, reference being had to the figures of the accompanying drawing, wherein like reference numerals indicate like parts.

In the drawings:—

Figure 1 is a side view, partly in section illustrating my invention.

Figure 2 is a detail cross section on the line 2—2 of Figure 1.

Figure 3 is an end view taken on the line 3—3 of Figure 1.

When sound is photographed on film, it is desirable to in some way indicate the title of the sound record and the purpose of my invention is to so indicate the title by photographing the same directly on the same film with the sound record, and to photograph such title simultaneously with the recording of such record. This method of titling sound records is particularly useful when for instance there is being recorded a series of musical numbers one after the other on a single strip of film or on a separate film. In such event a title film may be prepared in advance of the recording of such records and the title of these records photographed on the film with the sound records at the same time they are recorded. When the recording of one particular number has been completed, the title film may be shifted so that the proper title of the next number being recorded may be photographed as before.

In carrying out my invention, I provide a support or base member 1 upon which may be mounted a sound or recording camera 2, and a motor or other source of power 3. The usual film magazine 4 is mounted on the camera 2, and passing through the camera at the lower portion thereof is a shaft 5, mounted upon which within the camera is a sprocket 6 around which the film 7 is passed and by means of which it is moved continuously. As shown clearly in Figure 1, the film 7 moves downwardly through the camera around the sprocket 6 and upwardly, parallel with itself and back to the take up reel in the film magazine 4. The shaft 5 carries a large combined pulley and fly wheel 8 around which passes a belt 9 also passing around the pulley 10 on the motor 3. This provides for the rotation of the shaft 5 and consequently the sprocket 6.

As the film 7 moves downwardly from the film magazine to the sprocket 6, it passes a sound recording station comprising a film guide 11 provided with a slit member 12 past which and in engagement with which the film 7 moves. Back of the slit member 12 is a recording lamp 13 suitably housed in the tube 14. The intensity of the light from the lamp 14 is modulated by the sound from the microphone and such modulated light passes through the slit member 12 to the film 7 whereby the sound is photographed thereon. A gate member 15 serves to guide the film 7 on its downward movement at this point and holds it in engagement with the slit member 12. The mechanism just described is that for an ordinary sound camera for the photographic recording of sound. In order that the title of the sound record being recorded may be photographed on the same film 6, the following mechanism is provided.

Mounted upon the base 1 on the opposite side of the camera 2 from the sound recording station are upstanding bearings 16. Mounted for rotation in these bearings is a shaft 17 parallel with the shaft 5. Secured upon this shaft 17 is a worm gear 18 meshing with a worm gear 19 on a shaft 20 extending between the shafts 5 and 17 and at right angles thereto and supported in bearings 21. The opposite end of this shaft 20 is provided with a gear 22 meshing with a worm gear 23 secured to the shaft 5.

Mounted upon the shaft 17 is a second sprocket 24 exactly the same size as the sprocket 6. Obviously, therefore, upon operation of the motor and rotation of the shaft 5 through the means of the pulley 8, both the sprockets 6 and 24 will be rotated simultaneously and synchronously.

The sprocket 24 is secured for rotation with the shaft 17 by means of an elongated key 25 on the shaft 17, which key permits sliding movement of the sprocket 24 on the shaft. The shaft 17 is provided with a plurality of recesses or indentations 26 adapted to receive the spring pressed detent 27 carried by the sprocket 24 and projecting into the bore thereof, whereby the sprocket may be adjusted to one of a plurality of positions on the shaft 17 and secured in such adjusted position.

The sprocket 24 is adapted to engage with and move a title film 28 preferably in the form of an endless band upon which has been printed or marked in some suitable manner a plurality of titles side by side, as indicated at 29. This title film 28 is prepared in advance of the recording operation and the operator ascertains the titles of the sound records to be recorded and prints them on the title film. The titles are spaced on the films the same distance apart as the indentations 26 on the gear shaft 17, whereby when the sprocket 24 and the film 28 are shifted on the shaft 17, one of the titles 29 will be in alignment for the photographing operation to be described.

The camera casing 2 is provided with a housing 30, the inner end 31 of which serves as a film guide for the film 7 on its upward movement after leaving the sprocket 6. A suitable film gate 32 serves to hold the film 7 into engagement with the film guide 31. This film guide 31 is provided with a slit or aperture 33 through which the title images from the film 28 may be photographed on the film 7. Lenses 34 are provided in the housing 30, in alignment with the slit or exposure opening 33 and any suitable or desirable focusing means may be provided for such lenses.

The outer ends 35 of the housing 30 likewise provides a film guide, this time for the endless title film 28, moved past such guide by the sprocket 24. This film guide 35 is provided with an exposure opening 36 in alignment with the lenses 34 and opening 33. Pivoted to the film guide 35 as at 37 (see Figures 2 and 3), is a film gate 38 adapted to close against the film guide 35 and move the film 28 in flat engagement therewith as the film moves past the same. The film gate 38 is likewise provided with an aperture 39 for exposure, in alignment with the opening 36. The curved guide member 40 is carried by the upper edge of the film gate 38 for guiding the film 28 into the exposing position between the gate 38 and guide 35.

Mounted upon the outer surface of the film gate 38 is a lamp housing 41 carrying a lamp 42 connected to receive its electric current from any suitable source (not shown). A ground glass or diffusing screen 43 is located within the housing 41 and through this ground glass the rays from the lamp 42 pass through the exposure openings 39, 36 lens 34 and exposure opening 33.

It will be observed with reference to Figure 2 that the sound is recorded on the film 7 adjacent one edge thereof and the title from the title film 28 is photographed on the film 7 at the opposite edge from the sound records. It will also be clear from Figures 2 and 3 that the film guide 35 and gate 38 are wide enough to permit the film 28 to be adjusted laterally thereof with the sprocket 24 in order to bring each of the titles 29 into registration with the exposure aperture for the printing operation.

In the operation of my invention, it will be understood that when a sound record is being recorded, the endless band 28 is adjusted with the sprocket 24 on the shaft 17 so as to bring the title of such sound records into position for exposure on the film 7. When this record has been completed and a different record is to be made, the sprocket 24 and film 28 are again adjusted to bring the title of the next record to be recorded into photographic position. Inasmuch as both the films 7 and 28 are driven at the same speed, the title of a given sound record being recorded will be continuously photographed at spaced intervals on the sound film, whereby when such film has been developed the title will appear visible on the sound record adjacent the record which it designates.

Of course, many changes may be made by way of detail without departing from the spirit and scope of my invention. I do not limit myself therefore, to the exact form herein shown and described other than by the appended claims.

I claim:—

1. In combination with a sound camera, means in said camera for recording sound on a film movable therethrough, an endless title film, means comprising a series of gears mounted upon a shaft for moving said title film synchronously with said sound recording film, a plurality of titles on said title film, and means for selectively printing one of said titles on said sound film during such movement.

2. In combination with a sound camera, means in said camera for recording sound on a film movable therethrough, an endless title film, means for moving said title film synchronously with said sound recording film, a plurality of titles laterally disposed on said title film, and means for selectively printing one of said titles on said sound film during such movement, said title film and its moving means being shiftable laterally of said sound film.

3. In combination with a sound camera, a shaft in said camera, a sprocket on said shaft, means for recording sound on a film movable by said sprocket, a second shaft, a sprocket on said second shaft, said two shafts and sprockets being driven simultaneously, a title film movable by said second sprocket, a plurality of titles laterally disposed on said title film, means for laterally shifting said title film and means for printing titles from said title film on said sound recording film.

4. In combination with a sound camera, a shaft in said camera, a sprocket on said shaft, means for recording sound on a film movable by said sprocket, a second shaft, a sprocket on said second shaft, said two shafts and sprockets being driven synchronously, a title film movable by said second sprocket, a plurality of titles laterally disposed on said title film, means for laterally shifting said title film with respect to said sound recording film and means for printing titles from said title film on said sound recording film, said means comprising a lamp back of said title film, film gates through which said films move, and exposure openings in said gates in alignment with said lamp.

5. In combination with a sound camera, a shaft in said camera, a sprocket on said shaft, means for recording sound on a film movable by said sprocket, a second shaft, a sprocket on said second shaft, said two shafts and sprockets being driven synchronously, a title film movable by said second sprocket, a plurality of titles laterally disposed on said title film, means for laterally shifting said title film with respect to said sound recording film and means for selectively printing one of said titles on said sound recording film, said means comprising a lamp back of said title film, film gates through which said films move, and exposure openings in said gates in alignment with said lamp, and a lens between said film gates through which the light from said lamp passes.

6. In combination with a sound camera, means for recording sound on a film movable in said camera, a title film movable synchronously with said sound film, a slidably adjustable sprocket for moving said title film, a plurality of titles on said title film, means for adjusting said sprocket to bring one of said titles into printing relation with said sound film, and means for printing said title on said sound film in such position.

7. In combination with a sound camera, means for recording sound on a film movable in said camera, a title film movable synchronously with said sound film, a slidably adjustable sprocket for moving said title film, a plurality of titles on said title film, means for adjusting said sprocket to bring one of said titles into printing relation with said sound film, and means for printing said title on said sound film in such position, and a film gate for said title film, said gate being of a width sufficient to permit said title film adjustment.

8. In combination with a sound camera, means for recording sound on a film movable in said camera, a title film movable synchronously with said sound film, a slidably adjustable sprocket for moving said title film, a plurality of titles on said title film, means for adjusting said sprocket to bring one of said titles into printing relation with said sound film, and means for printing said title on said sound film in such position, and a film gate for said title film, said gate being of a width sufficient to permit said title film adjustment, and means for frictionally locking said sprocket in adjusted position.

9. In combination, means for recording a sound record on a film, a second film shiftable laterally and bearing a plurality of titles in parallel arrangement, means for synchronously moving said films, and means for titling said sound recording film simultaneously with the recording of a sound record thereon.

10. In combination, means for recording a sound record on a film, a second film bearing a plurality of titles in parallel rows, means for synchronously moving said films, means for laterally shifting said title film with respect to said sound recording film, an optical system intermediate said films, and means for titling said sound recording film simultaneously with the recording of a sound record thereon.

FREEMAN H. OWENS.